United States Patent [19]

Cline

[11] 4,396,219
[45] Aug. 2, 1983

[54] VEHICLE BED LINER

[76] Inventor: Harold W. Cline, 6976 E. 76th St., Tulsa, Okla. 74133

[21] Appl. No.: 330,239

[22] Filed: Dec. 14, 1981

Related U.S. Application Data

[63] Continuation of Ser. No. 212,892, Dec. 4, 1980, abandoned, which is a continuation of Ser. No. 7,238, Jan. 29, 1979, abandoned.

[51] Int. Cl.$^3$ ............................................. B62D 33/02
[52] U.S. Cl. .................................... 296/39 R; 105/423
[58] Field of Search .................. 296/37.1, 37.6, 37.14, 296/39 R, 39 A, 189; 280/783, 784; 105/423; 293/109, 120; 267/139

[56] References Cited

U.S. PATENT DOCUMENTS

| | | | |
|---|---|---|---|
| 1,980,787 | 11/1934 | Dayes | 296/39 A |
| 2,116,771 | 5/1938 | Seaman | 296/39 A X |
| 2,326,717 | 8/1943 | Zeidler | 105/423 X |
| 2,962,323 | 11/1960 | McBride | 105/423 |
| 3,163,434 | 12/1964 | Krueger | 105/423 X |
| 3,303,617 | 2/1967 | Hessburg, Jr. et al. | 105/423 |
| 3,666,310 | 5/1972 | Burgess et al. | 293/109 |
| 3,711,148 | 1/1973 | Hindin | 105/423 X |
| 3,814,473 | 6/1974 | Lorenzen, Jr. | 296/39 R |
| 4,029,354 | 6/1977 | Valeri | 296/39 R X |
| 4,127,294 | 11/1978 | Cooper | 293/120 |
| 4,161,335 | 7/1979 | Nix et al. | 296/39 R |
| 4,190,281 | 2/1980 | Chandler | 280/759 X |
| 4,245,863 | 1/1981 | Carter | 296/39 R |

FOREIGN PATENT DOCUMENTS

| | | | |
|---|---|---|---|
| 2006741 | 9/1971 | Fed. Rep. of Germany | 296/39 R |
| 1011938 | 12/1965 | United Kingdom | 296/39 R |
| 1512511 | 6/1978 | United Kingdom | 296/39 R |

Primary Examiner—Joseph F. Peters, Jr.
Assistant Examiner—Michael Mar
Attorney, Agent, or Firm—Head, Johnson & Stevenson

[57] ABSTRACT

A liner kit for pickup truck beds or other vehicle carrier beds. The liner is in the form of a panel wherein a shock absorbant material is molded to conform to the sidewall cavity and also to the front panel and floor of the vehicle bed. Plate metal panels are then secured to the opposite surface of the shock absorbant material. The panels are then connected in place within the vehicle carrier bed by suitable adhesives.

1 Claim, 14 Drawing Figures

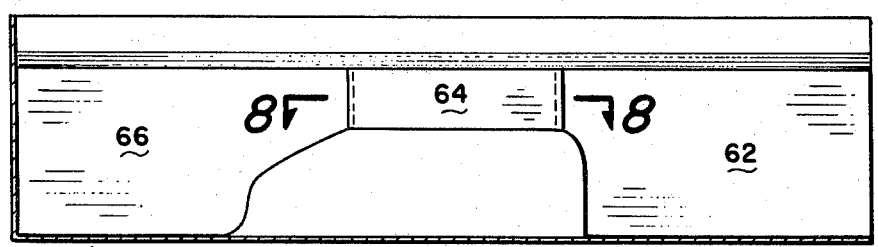
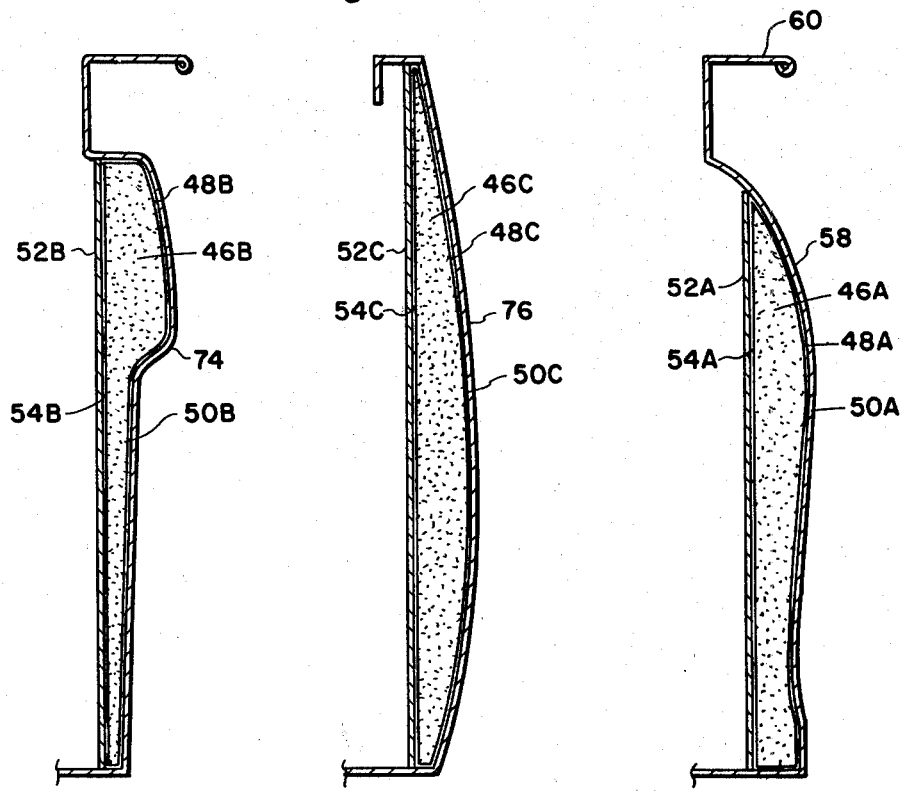
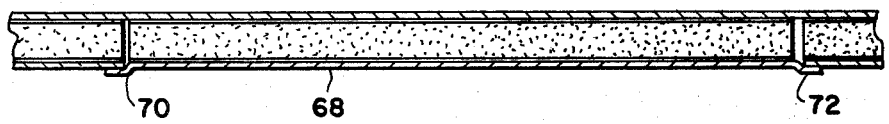

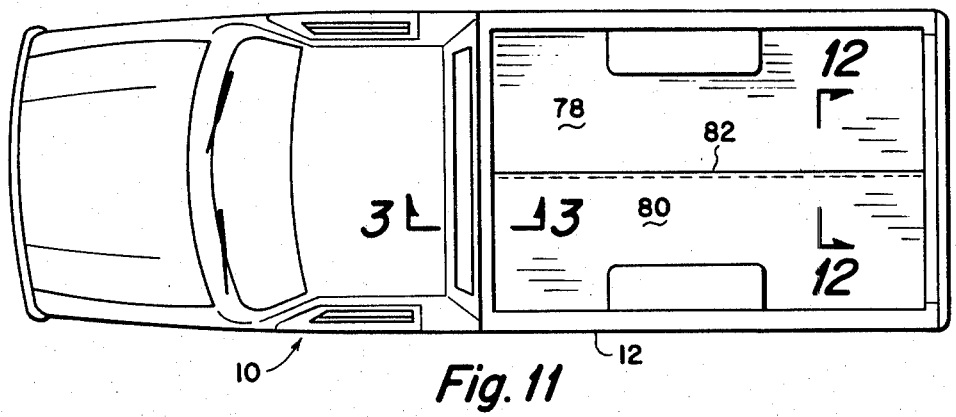
Fig. 11
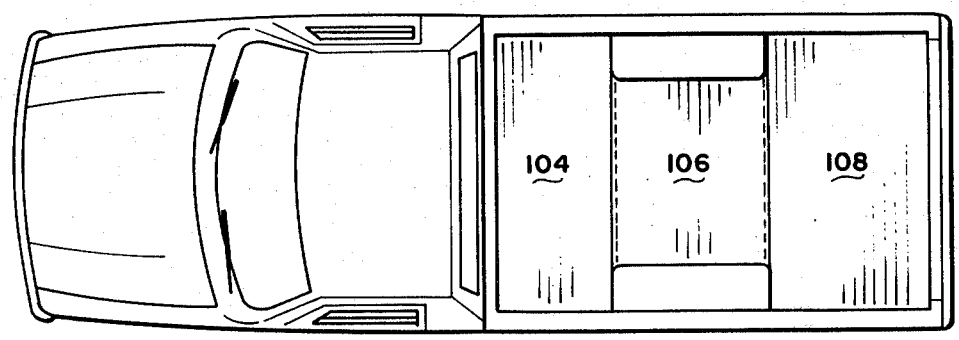
Fig. 14
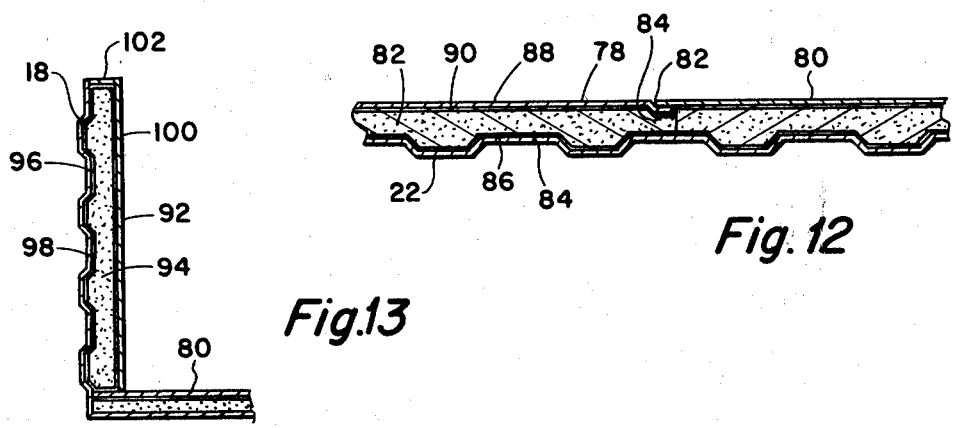
Fig. 13
Fig. 12

VEHICLE BED LINER

This is a continuation of application Ser. No. 212,892, filed Dec. 4, 1980 now abandoned, which is a continuation of application Ser. No. 7,238, filed Jan. 29, 1979 now abandoned.

BACKGROUND OF THE INVENTION

1. Field of the Invention

The present invention relates to shock absorbant panels for carrier vehicle beds and more particularly, but not by way of limitation, to liner panels for protecting the inside surface of the carrier vehicle beds.

2. History of the Prior Art

Most of the currently popular mini-pickup trucks being marketed are constructed with a small carrier bed, the sidewalls of which are of a single wall metal construction. This construction naturally has the benefits of effecting a reduction in the cost of the trucks and also a reduction in weight which in turn provides a reduction in energy consumption.

However, if the truck is utilized as a work vehicle as opposed to a pleasure vehicle, very distinct problems arise in this single wall construction. When heavy objects are loaded into the pickup truck bed, often these objects strike the sides of the wall from the inside causing an indentation in the inside surface of the metal. Since there is only a single wall construction, this dent shows up as an unsightly protrusion along the outside wall of the pickup truck.

Even if the bed is loaded carefully, often items become loose and slide or roll against the inside wall again causing damage to both the inside and outside surface of the pickup bed. Repair of such damage is very expensive since both the outside and inside has to be smoothed and refinished in order to restore the original appearance of vehicle.

A lesser problem, but still a problem, is the damage often done to the front wall and the floor of the vehicle bed. Whereas, dents in the front wall floor do not show up on the exterior of the pickup truck, they nonetheless detract from the appearance of the truck and reduce the resale value.

SUMMARY OF THE PRESENT INVENTION

The present invention provides a plurality of liner panels which are particularly adaptable for use with the mini-pickup truck bed and are constructed in such a way to overcome the problems and disadvantages hereinbefore set forth.

The panels are primarily constructed of a lightweight shock absorbent, insulative material such as polymer or styrene also known under the common name of Styrofoam. These panels have one side surface molded or formed into the shape of and complimentary to, the contours of the inside surface of the walls and floors of the truck bed.

The opposite surface of these panels are provided with plate metal sheets which are secured to the shock absorbant panels by a suitable adhesive. These metal plates may then be painted to match or compliment the original vehicle paint.

When the metal plates of the liners receive a blow which would normally cause a dent in the metal construction of the pickup bed, often the resiliency of the shock absorbant material forces the metal back to its original shape thereby eliminating what could become a costly repair. If the blow is sufficiently severe to cause a permanent dent in the plate the depression will usually be taken up by the compressive nature of the shock absorbant material and will not cause damage to the outer surface skin of the vehicle.

Even when damage occurs to the panels, they will still be useful although possibly less attractive. To restore the appearance of the panels would only require repairing or replacement of the damaged panel.

A related advantage occurs in the forming of the outside surface of the shock absorbant material to conform to the contours of the inside surface of the pickup bed and then bonding the shock absorbent panel directly to the pickup bed surface. This material serves to greatly strengthen the outer skin material of the pickup. Hence, in many cases when the outside wall of the pickup receives a blow, the resiliency of the shock absorbant material will force the outside material back out to its original shape resulting in little or no damage.

When damage does occur to the outside wall, only the outside surface has to be repaired and refinished where as hereinbefore pointed out in single wall construction both the outside and inside would have to be refinished to restore the original appearance of the vehicle.

The inner surface of the panels consisting of metal plates, are constructed to form perpendicular intersections within the pickup bed which serves to "square up" the walls and floor of the pickup bed which in turn facilitates loading and tends to again improve the appearance.

It will be readily apparent that although the single wall construction of various small pickup trucks produced the impetus for the present invention, the present invention can easily be utilized on ordinary pickup trucks having beds of double wall thickness or on any other suitable carrier vehicle such as a trailer bed.

Further, by breaking the liner into a plurality of panels, packaging and installation is greatly facilitated and as pointed out, a damaged panel can be more easily and economically replaced or repaired.

BRIEF DESCRIPTION OF THE DRAWINGS

Other and further advantageous features of the present invention will hereinafter more fully appear in connection with a detailed description of the drawings in which:

FIG. 6 is a side elevational sectional view of an alternate pickup truck bed having panels embodying the present invention.

FIG. 7 is an end elevational sectional view of the pickup bed sidewall of FIG. 6 taken along the broken lines 7—7 of FIG. 6.

FIG. 8 is a top elevational sectional view of the pickup bed sidewall of FIG. 6 taken along the broken lines 8—8 of FIG. 6.

FIG. 9 is an end elevational view of a second alternate pickup bed sidewall having a panel embodying the present invention.

FIG. 10 is an end elevational sectional view of the sidewall of a third alternate pickup design having the liner panel embodying the present invention.

FIG. 11 is a plan view of a small pickup truck having floor panels embodying the present invention.

FIG. 12 is an end elevational sectional view of a portion of the pickup bed of FIG. 11 taken along the broken lines 12—12 of FIG. 11.

FIG. 13 is a side elevational sectional view of the front end panel of the pickup truck bed of FIG. 11 taken along the broken lines 3—3 of FIG. 11.

FIG. 14 is a plan view of a pickup truck having a second embodiment of floor panels embodying the present invention.

DESCRIPTION OF THE PREFERRED EMBODIMENTS

Figure 1:
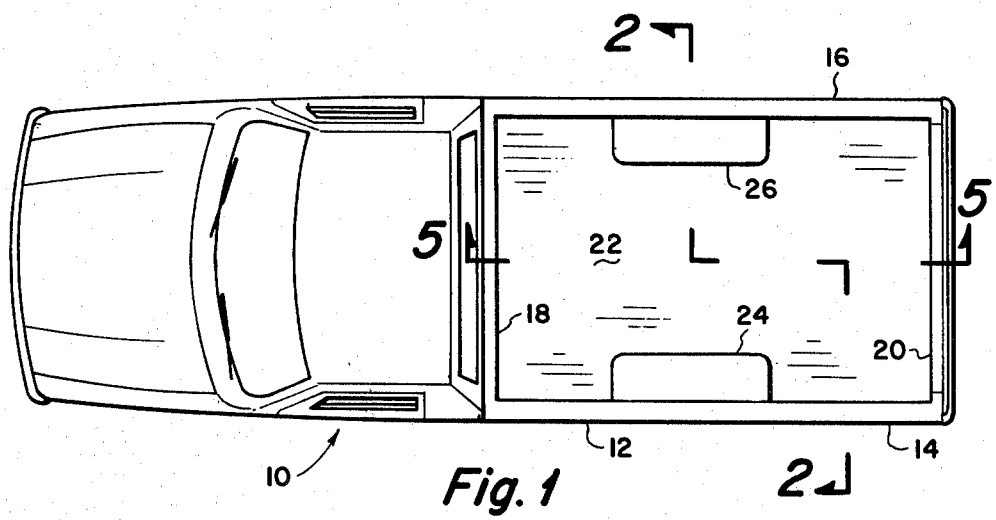
FIG. 1 is a plan view of a small pickup truck.

Referring to the drawings in detail, reference character 10 generally indicates a small pickup truck, this particular drawing being fashioned after the truck known in the market as the Ford Courier having a pickup bed 12 which consists of left and right sidewalls 14 and 16, a front end wall 18, a tailgate 20 and floor member 22. Protruding into the interior of the pickup bed are left and right wheel well coverings 24 and 26, respectively.

Figure 2:
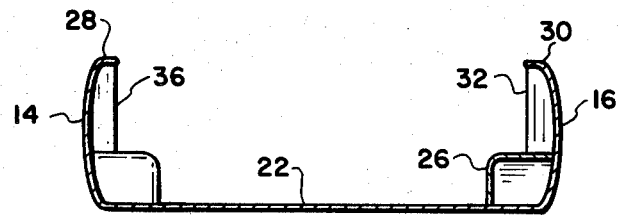
FIG. 2 is an elevational sectional view of the pickup truck bed of FIG. 1 taken along the broken lines 2—2 of FIG. 1.

The sidewalls 14 and 16 are provided with inwardly extending rail portions 28 and 30 along the upper edges thereof. Strengthening brace members 32 and 34 are provided on each sidewall extending from the wheel well cover 26 up to the rail member 30 and which are further connected to the sidewall member 16. The left sidewall is provided with similar strengthening members, the rear one 36 of which is visible in FIG. 2. It is noted that the sidewall panels 14 and 16 of this particular pickup truck is of single walled metal construction.

The present invention provides three shock absorbant panels, a front panel 38, intermediate panel 40 and rear panel 42 which serve as liners for the right side wall 16 of the pickup truck bed. Similar panels are provided for the left side, the rear panel 44 being visible in FIG. 3. Typical of the panels are the panel member 44 shown in FIGS. 3 and 4 and which comprise a shock absorbant portion 46, the outer surface 48 thereof being shaped to conform to the inner surface of the vehicle sidewall 14 and being bondable thereto by a suitable adhesive shown as reference character 50.

Figure 5:
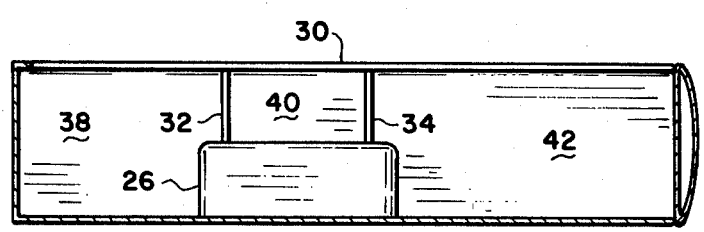
FIG. 5 is a side elevational sectional view of the pickup bed of FIG. 3 taken along the broken lines 5—5 of FIG. 3.

The inner surface of the shock absorbant material 46 is provided with a metal plate 52 which completely covers the inner surface of the absorbant material and is secured thereto, also by a suitable adhesive 54. When the panels are set in place as shown in FIG. 5, only the outer metal plate members are visible and may be coated with a suitable paint that either matches or is complimentary with the vehicle paint. The shock absorbant material 46 may be of any suitable simi-rigid plastic such as polymer or styrene.

Referring now to FIGS. 6, 7 and 8, reference character 56 generally denotes the inside left panel of another variety of pickup truck bed typical of the Datsun and Toyota pickup trucks. In this particular construction, it can be seen that the sidewall 58 is similar to that of the Ford Courier but has different contours and a slightly different configuration of the top rail member 60.

In this configuration, there are again shock absorbant panels, a front panel 62, mid panel 64 and rear panel 66. It is noted that this particular configuration of pickup truck bed has no strengthening members similar to the members 32 and 34 of the pickup truck of FIG. 5. However, although the liner panel could be made as a single panel, it is broken up into three separate panels for ease of packaging and installation. The construction of the panel is similar to that hereinbefore described and generally comprises a shock absorbant panel material 46A, the outer surface 48A being shaped to conform to the inner surface of the sidewall 58 and being attached thereto by a suitable adhesive 50A.

The inside surface of the absorbant panel 46A is provided with a metal plate member 52A which is bonded thereto by a suitable adhesive 54A. Referring to FIG. 8 it can be seen that the metal plate 68 of the mid panel 64 is provided with off-set lip portions 70 and 72 at the outer ends thereof so that the metal plates will overlap thereby providing a substantially continuous metallic metal surface on the inside of the pickup bed.

Referring to FIG. 9, the shape of the side wall 74 conforms with the general cross-sectional shape of the sidewall of the pickup truck known as the Chevrolet Luv, the contour of which is different from those hereinbefore described but still of a single wall thickness. Again, the typical panel comprises a shock absorbing portion 46B, one surface thereof 48B being shaped to fit the contours of the inner surface of the sidewall 74 and attached thereto by a suitable adhesive 50B. The inner surface of the absorbant panel is provided with a metal plate 52B attached by way of an adhesive 54B.

FIG. 10 represents an elevational cross-sectional view of one side panel of the Dodge small pickup truck having a sidewall 76 which has a curvature similar to that of the Ford Courier. The shock absorbant panel construction is essentially the same, that being a shock absorbant material 46C having an inner surface 48C conforming to the inside surface of the sidewall 76 and attached thereto by a suitable adhesive 50C. The inner surface of the shock absorbant material 46 is provided with a metal plate 52C attached by way of an adhesive 54C.

It will be noted that in each of the configurations, the inside metal panel 52 extends from the floor of the pickup bed vertically to the upper rail thereby completely enclosing the cavity provided by the contour of the outer wall of the side panels. In this manner, the shock absorbant material 46 is completely covered by the metal plates thereby substantially reducing the wear and tear on the shock absorbant material itself.

Referring now to FIG. 11, reference characters 78 and 80 depict floor panels which are shaped to conform to the right and left sides of the pickup bed floor. These panels have a longitudinal seam 82 down the middle of the pickup bed for joining the panels 78 and 80 together. Referring to FIG. 12, reference character 22 again depicts the floor of the pickup bed showing that the floor of most such beds are provided with a plurality of longitudinal ridges which provides strengthening to the floor member.

The absorbant panels 78 and 80 are constructed similar to the sidewall panels in that each are provided with a shock absorbant material 82 having a lower surface 84 which is shaped to conform to the design or contours of the floor 22 in the pickup bed. The liner surface 84 of the shock absorbant material is bonded to the floor of the pickup bed by a suitable adhesive 86. The top surface of the absorbant material is provided with a metal plate covering 88, it being bonded to the absorbant material by a suitable adhesive 90. It can also be seen that the seam 82 may be flush with the flooring of the pickup bed by the provision of an offset strip 84 of the paneling member 78.

Figure 3:
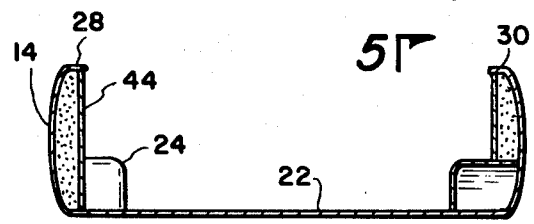
FIG. 3 is an end elevational sectional view of FIG. 1 having side liner panels embodying the present invention.
Figure 4:
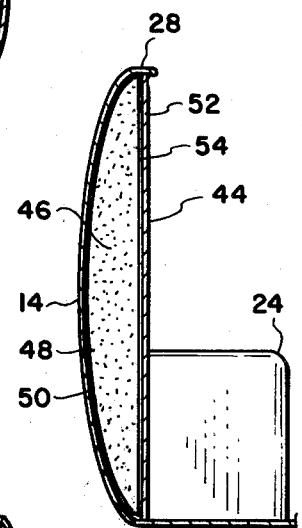
FIG. 4 is a detailed elevational view of a portion of the structure of FIG. 3.

FIG. 3 depicts a detail of the front end wall 18 of the pickup bed, it being provided with a liner panel 92. The liner panel comprises a shock absorbant material portion 94 having the front surfaces 96 thereof shaped to conform with the contours of the end wall 18. The shock absorbant material is attached to the end wall 18 by a suitable adhesive 98. The rear surface of the absorbant material 94 is provided with a metal plate portion 100 which has a forwardly extending lip portion or flange 102 along the upper surface thereof to protect the shock absorbant material from exposure. It is to be noted that whereas the drawings have been described depicting the inside surface plates of the liner panels to be of a metal construction, they could be constructed of a hard plastic material or even wood and still conform to the teachings of the invention.

FIG. 14 depicts a floor liner having a front panel 104, mid-section panel 106 and rear section panel 108 which are similar in construction to the panels 78 and 80 but are provided with transverse seams rather than a single longitudinal seam.

From the foregoing, it is apparent that the present invention provides a system of liner panels that may be installed to completely protect the inside surface of the pickup truck bed. It is also readily apparent that the user may simply wish to purchase side panel members as opposed to floor panels in front of the end panel or any combination thereof.

Whereas, the present invention has been described in particular relation to the drawings attached hereto, other and further modifications apart from those shown or suggested herein my be made within the spirit and scope of the invention.

What is claimed:

1. An after market shock absorbing liner for the vertical sides of a load carrying vehicle of the type having a bed surrounded by vertically arranged sidewalls, the liner being of light weight construction and comprising:
   (a) a plurality of side panels extending substantially throughout the length of the bed, each panel having an outer member constructed from a resilient plastic material and having a convex configuration conforming to the contour of the interior surface of the vehicle sidewall and disposed thereagainst,
   (b) an inner metallic member spaced from said outer member and having a substantially flat vertical surface facing the vehicle bed,
   (c) a insert constructed of resilient shock absorbing material interposed between said inner and outer members for reducing shock transmitted to the interior surface of the vehicle sidewalls,
   (d) means for securing said outer member and said inner member to said shock absorbing material, and
   (e) adhesive means for securing the outer member of said panel to the interior surface of the vehicle sidewall.

* * * * *